Dec. 9, 1969 G. N. STARR 3,483,365
LUMINAIRE SPIRAL RING COUPLING MEANS
Filed April 10, 1967
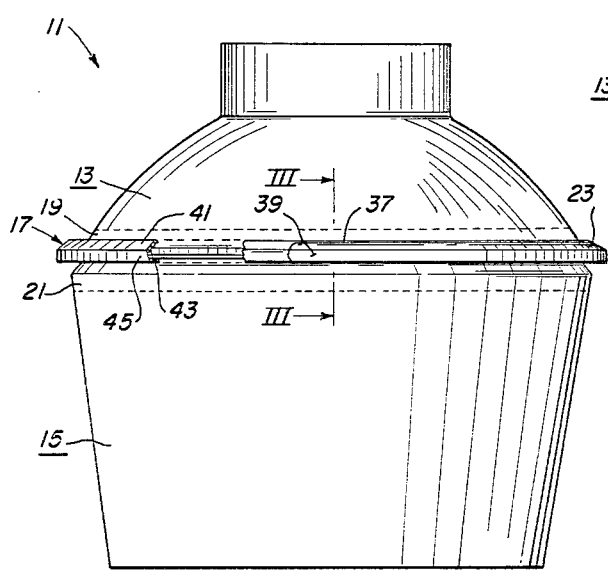
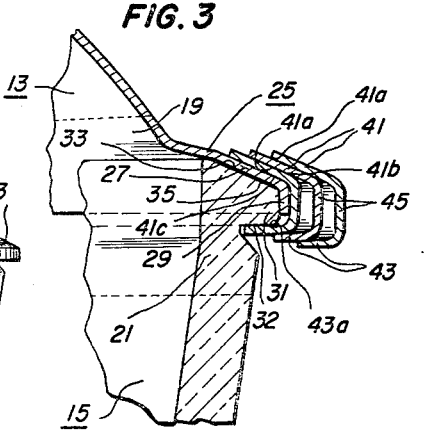
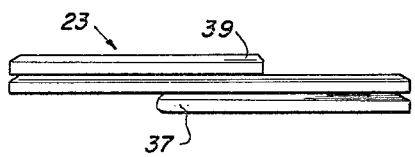
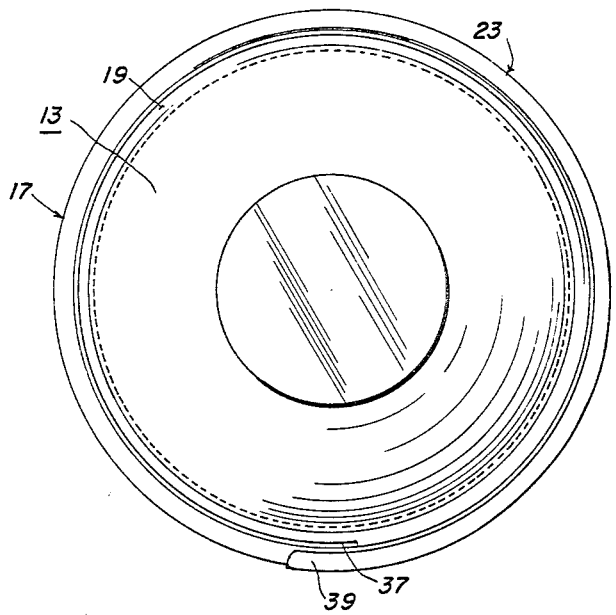
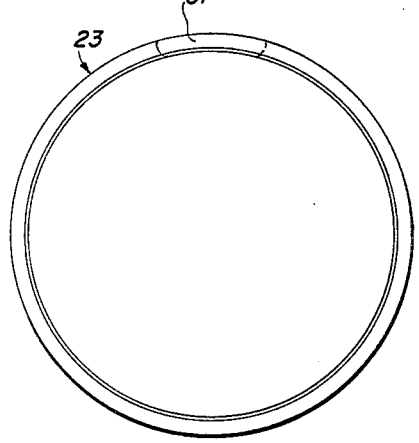
INVENTOR.
GEORGE N. STARR
BY John R. Walker, III
Attorney United States Patent Office 3,483,365
Patented Dec. 9, 1969

3,483,365
LUMINAIRE SPIRAL RING COUPLING MEANS
George N. Starr, Memphis, Tenn., assignor to American Electric Manufacturing Corporation, Southaven, Miss.
Filed Apr. 10, 1967, Ser. No. 629,729
Int. Cl. F21v 13/04
U.S. Cl. 240—93                                     11 Claims

ABSTRACT OF THE DISCLOSURE

A coupling arrangement for a luminaire including a first element or luminaire reflector having an annular external flange, a second element or luminaire refractor having an annular external flange, and a spiral-shaped coupling ring having a continuous groove or recess extending along the inner circumference of the ring. The coupling ring is adapted to be hand-installed by spiralling the ring over the coaxially arranged juxtapositioned flanges of the first and second elements and with the ring in an installed disposition assuming the form of a plane curve spiral and with the opposite end portions of the coupling ring being in radially overlapping arrangement.

BACKGROUND OF THE INVENTION

Field of the invention

The invention relates to a luminaire coupling means for removably securing or coupling a refractor to a reflector.

Description of the prior art

A typical coupling means for securing luminaire refractors and reflectors together is by means of a split clamping ring. The split clamping ring is secured around the flanges of the refractors and reflectors by various means which draw the ends of the clamping ring together; screws, springs and toggle lock arrangements have been employed in drawing the ends of the split-type clamping ring together.

Such split-type clamping ring means has presented certain problems: The split ring type clamping means typically does not clamp the entire circumference of the flanges but a gap is usually present between the clamp ring ends. Such a gap prevents a full 360° clamping action on the flanges of the elements. Also, the projecting springs, screws and toggle projections are unsightly and detract from the appearance of the coupling means and from the overall appearance of the completed luminaire assembly. A further disadvantage with certain prior art coupling means is that considerable time and effort is necessary to effect the coupling and often various hand tools are required to clamp and connect the ends of the coupling ring. In addition, many of these prior clamping means are relatively complex and expensive to manufacture.

SUMMARY

The concept of the invention is to provide a spiral ring coupling means which is adapted to be quickly and easily installed on the external flange portions of luminaire reflectors and refractors. The ring in its inoperative disposition is in the form of a cylindrical helix and with the diameter of the helix being slightly less than the diameter of the flange portions of the reflector and refractor; the ring in its operative disposition, and when it is installed and functioning to secure the reflector and refractor together, being in the form of a plane curve spiral, that is, lying substantially in a single plane and with the opposite end portions of the coupling ring preferably being in radially overlapping arrangement. The spiral ring coupling means is quickly and easily removed or installed and the secured elements are readily manipulated or adjusted. The coupling ring of the present invention presents a substantially smooth continuous circumference and does not present a circumference having screws, springs or toggle lock projections. The smooth circumference of the coupling ring provides a clean and uncluttered overall appearance and design. In addition, it is relatively easy and inexpensive to manufacture.

BRIEF DESCRIPTION OF THE DRAWINGS

FIG. 1 is a side elevational view illustrating the coupling means of the present invention in combination with a street luminaire and with a portion of the coupling ring being broken away for clarity.

FIG. 2 is a top plan view of the street luminaire as illustrated in FIG. 1.

FIG. 3 is a vertical plane sectional view taken as on the line III—III of FIG. 1.

FIG. 4 is a side elevational view of the coupling ring removed from its environment and arranged in an inoperative disposition.

FIG. 5 is a bottom view of the coupling ring taken as from FIG. 4.

DESCRIPTION OF THE PREFERRED EMBODIMENT

A preferred embodiment of the invention is illustrated in the drawings which shows the invention in combination with a street luminaire indicated 11, and a luminaire including a reflector 13 and a refractor 15. Support means (not shown) secured by suitable means to reflector 13 support the luminaire in a typical manner from a street lamp standard (not shown) or the like.

The coupling means of the present invention, indicated 17, includes a first annular element 19, a second annular element 21, and a spiral clamping ring 23 removably securing annular elements 19, 21 together.

First annular element 19 constitutes the lower circumferential portion of reflector 13 and terminates in a circumferentially extending external flange portion indicated 25. Flange portion 25 includes a downwardly and outwardly projecting circumferential proximal portion 27 and a somewhat cylindrical short distal portion 29 integrally secured to proximal portion 27. It will be understood that portion 29 may be omitted without departing from the spirit and scope of the present invention.

Second annular element 21 constitutes the upper circumferential portion of refractor 15 and includes a circumferentially extending external flange portion 31 integrally formed circumferentially along the upper rim portion of refractor 15 and having a horizontally extending lower surface 32. The circumferentially extending beveled upper surface 33 of refractor flange portion 31 is adapted to correspondingly engage the circumferentially extending beveled undersurface 35 of first annular element proximal portion 27.

Coupling ring 23 preferably is formed of sheet metal material and, in radial section is substantially U-shaped. It will be understood that the material of which ring 23 is formed is preferably reasonably elastic, that is, the characteristics are such that no permanent set is obtained when installed whereby a continuous pressure is maintained, which in addition to rendering the coupling more effective enables the ring to be reused. Spiral shaped coupling ring 23 preferably extends slightly more than two complete turns (as shown in the drawings) and terminates respectively in overlapped opposite end portions 37, 39 (see FIGS. 2 and 4). If desired, the ring 23 may be shortened so that the end portions 37, 39 don't overlap, but the ring should extend for at least 1½ turns.

Coupling ring 23 includes an upper rim portion 41 extending inwardly radially and along the inner circumference of the ring; a lower rim portion 43 extending inwardly radially and along the inner circumference of the ring and a somewhat cylindrical base portion 45 arranged along the outer circumference of the ring and integrally interconnecting upper and lower rim portions 41, 43. Upper rim portion 41 of ring 23 is beveled along a radial angle corresponding to the radial angle of reflector flange proximal portion 27. It should be pointed out that it is preferable that at least one of the rim portions 41 or 43 is beveled, as above described for rim portion 41, particularly on the surfaces where portions of the ring 23 overlie other portions so that there is a wedging or locking action. It will be noted that the greater the forces acting outwardly on the ring from the inside, the greater the wedging or locking action. In other words, it is important that there is a wedging action and this is accomplished in the example shown by the overlying inner surface 41a of rim portion 41 being beveled or sloped and the outer surface 41b of the rim portion which inner surface 41a overlies being correspondingly beveled or sloped. It will be understood that this wedging or locking action may be accomplished by other configurations of ring 23 without departing from the spirit and scope of the present invention. It is not as important that the inner surface 41c of rim portion 41 which contacts flange surface 33 be beveled or sloped, but if it is beveled as shown, it provides the advantageous feature of wedging flange portions 25, 31 together. It may be desirable in certain applications to arrange surfaces 33 and 41c otherwise than on a slope, as for example, they may be arranged horizontally without departing from the spirit and scope of the present invention.

The inner surface 43a of rim portion 43 which contacts lower surface 32 is preferably horizontal, although surfaces 43a and 32 may be beveled, if desired.

For purposes of clarity in description, coupling ring 23, when it is in an inoperative disposition, will be considered as being in the form of a cylindrical helix (FIGS. 4 and 5); when coupling ring 23 is in its operative disposition and when it is installed and functioning to secure reflector 13 and refractor 15 together will be considered as being in the form of a plane curve spiral.

Coupling ring 23 is adapted to be fitted around reflector 13 and refractor 15 in the following manner: Refractor 15 and reflector 13 are concentrically fitted together and with refractor flange surface 33 correspondingly engaging reflector flange surface 35; coupling ring 23 is then placed concentrically over reflector 13 with coupling ring end portion 37 engaging reflector and refractor flange portions 25, 31. After end portion 37 of the coupling ring is started on and radially arranged over flange portions 25, 31 the remaining length of the coupling ring may then be spiralled on flanges 25, 31 by progressively urging the coupling ring downwardly and around flange portions 25, 31; with ring 23 completely installed in luminaire 11, the opposite end portions 37, 39 are arranged in radially overlapping configuration.

Coupling ring 23 preferably has the same radial dimensions and same cross-sectional form uniformly throughout the length of the coupling ring. Although such ring construction provides for economical manufacture and provides other desirable features, such a construction may not be desirable in every application of the invention. With reference to FIG. 3 it will be noted that a slight space is present between the respective turns or turn portions of coupling ring base portion 45. To reduce or eliminate such space between the turns of the coupling ring and provide a closer fitting ring, it may be desirable in certain applications of the invention to form the coupling ring with a progressively widening U-shaped contour. As for example, the coupling ring may be formed with a progressively widening U-shaped configuration extending from coupling ring end portion 37 to end portion 39.

In order for coupling ring 23 to concentrically fit snugly around first and second element flange portions 25, 31, the coupling ring is formed to a smaller diameter than the diameter of the flange portions; coupling ring 23 when in an inoperative cylindrical helix configuration is of a smaller diameter than when it is installed and is arranged in a plane curve spiral configuration.

Although the present invention has been described with reference to a preferred embodiment thereof, it is to be understood that it is not to be so limited since changes and modifications may be made therein which are within th full intended scope of this invention as hereinafter claimed.

I claim:

1. In a luminaire including a reflector element having a circumferentially extending annular external flange portion and a refractor element having a circumferentially extending annular external flange portion, a spiral shaped coupling ring having structure defining substantially a continuous recess extending along the inner circumference of said ring and with said recess being defined in part by first and second opposingly facing annular surfaces, said coupling ring being removably fitted respectively around said flange portions of said annular elements with said first and second annular surfaces of said coupling recess being in surface-to-surface engaging relationship with said flange portions respectively of said annular elements to hold said annular elements together, and said ring including frictional locking means for restraining said ring against expansion movement including opposing portions of said ring along the interior surface thereof frictionally contacting and overlying other portions of said ring facing oppositely along the exterior surface thereof.

2. The combination according to claim 1 in which said ring includes means for wedging the overlying portions of said ring together.

3. The combination according to claim 2 in which said means for wedging the overlying portions of said ring together comprises beveled rim portions included in said ring.

4. The combination according to claim 3 in which the material of said ring is elastic.

5. The combination of claim 3 wherein said coupling ring is formed of elastic sheet material and the ring in radial section is shaped with said first and second surfaces being in angular relationship.

6. The combination of claim 3 wherein said coupling ring is of spiral length of approximately two turns.

7. The combination of claim 3 wherein said coupling ring is of a spiral length of at least one and one-half turns.

8. In a luminaire, a refractor including a circumferentially extending flange portion defined in part by an upper annular surface and a lower annular surface, said upper surface being at an angle relative to said lower surface, a reflector including a circumferentially extending flange portion disposed at an angle and engaging said upper surface, said flange portions of said refractor and said reflector being coaxially arranged and in vertical juxtaposition, and a spiral-shaped coupling ring of a spiral length of at least one and one half turns, said coupling ring being formed of elastic sheet material and being generally U-shaped in radial section; said coupling ring including a lower rim portion, an upper rim portion extending at an angle relative to said lower rim portion, and a substantially cylindrical base portion arranged along the outer circumference of said ring and integrally interconnecting said upper and lower rim portions; said coupling ring being removably fitted around respectively said flange portions of said reflector and refractor with a portion of said upper rim portion and said lower rim portion being in surface-to-surface engaging relationship respectively with said flange portion of said reflector and said lower surface of said refractor to hold said reflector and refractor together, and said ring including frictional locking means for restraining said ring against expansion movement including opposing portions of said ring along the interior surface thereof wedgingly contacting and overlying other portions of said ring facing oppositely along the exterior surface thereof.

9. Means for coupling the reflector and refractor structure of a luminaire comprising external flange projection means supported on and arranged circumferentially about said reflector structure, external flange projection means supported on and arranged circumferentially about said refractor structure, and a coupling ring constrictingly simultaneously embracing said external flange projection means respectively of said reflector and refractor structure, said coupling ring, in operative configuration, being of plane curve spiral form and having structure defining a circumferential recessed interior and constrictingly engaging simultaneously said external flange projections respectively of said reflector and refractor structure, and including locking means including a radially inwardly arranged inner locking reach portion and an outer locking reach portion overreaching and frictionally matingly lockingly engaging said inner locking reach portion of said coupling ring.

10. The coupling means as defined in claim 9 wherein said locking means of said coupling ring includes an inner locking reach portion having radially outwardly convergingly directed circumferentially extending rim surfaces and includes an outer locking reach portion having radially inwardly divergingly directed circumferentially extending rim surfaces in frictional locking engagement with the outwardly convergingly directed rim surfaces of said inner locking reach portion of said coupling ring.

11. Means for coupling the reflector and refractor structure of a luminaire comprising means defining an external circumferential flange element on said reflector structure, means defining an external circumferential flange element on said refractor structure, and a coupling ring circumferentially simultaneously embracing said flange elements respectively of said reflector and refractor structure and holding said refractor structure together, said coupling ring being generally of plane curve spiral configuration and having radially inner and outer locking portions defining locking means for preventing expansion of said coupling ring, said inner locking portion of said ring having radially outwardly convergingly directed rim surfaces, said outer locking portion having radially inwardly divergingly directed rim surfaces of size and shape adapted for frictional mating locking engagement with the outwardlly convergingly directed surfaces of said inner locking portion of said coupling ring.

References Cited

UNITED STATES PATENTS

| 245,821 | 8/1881 | Harris | 215—96 |
| 2,147,963 | 2/1939 | Casciotti | 215—96 |
| 3,062,953 | 11/1962 | Clark et al. | 240—25 |

FOREIGN PATENTS 364,404   1/1932   Great Britain.

NORTON ANSHER, Primary Examiner

ROBERT P. GREINER, Assistant Examiner

U.S. Cl. X.R.

215—95; 240—41.5, 128